(12) United States Patent
Holliday

(10) Patent No.: US 7,372,255 B2
(45) Date of Patent: May 13, 2008

(54) DETECTION OF THE INSTANTANEOUS POSITION OF A LINEARLY RECIPROCATING MEMBER USING HIGH FREQUENCY INJECTION

(75) Inventor: Ezekiel S. Holliday, Belpre, OH (US)

(73) Assignee: Sunpower, Inc., Athens, OH (US)

( * ) Notice: Subject to any disclaimer, the term of this patent is extended or adjusted under 35 U.S.C. 154(b) by 0 days.

(21) Appl. No.: 11/520,129

(22) Filed: Sep. 13, 2006

(65) Prior Publication Data
US 2008/0061770 A1    Mar. 13, 2008

(51) Int. Cl.
G01B 7/14    (2006.01)
G01R 33/12    (2006.01)

(52) U.S. Cl. ................. 324/207.24; 324/234; 324/236
(58) Field of Classification Search ........... 324/207.24, 324/234, 236
See application file for complete search history.

(56) References Cited

U.S. PATENT DOCUMENTS

| | | | |
|---|---|---|---|
| 4,577,509 A * | 3/1986 | Moser | 73/658 |
| 4,587,850 A * | 5/1986 | Moser | 73/658 |
| 4,667,158 A | 5/1987 | Redlich | |
| 5,342,176 A | 8/1994 | Redlich | |
| 5,600,237 A * | 2/1997 | Nippert | 324/207.16 |

* cited by examiner

*Primary Examiner*—Reena Aurora
(74) *Attorney, Agent, or Firm*—Frank H. Foster; Kremblas, Foster, Phillips & Pollick

(57) ABSTRACT

A piston position sensing circuit for sensing the instantaneous position of a piston of a free piston Stirling machine or a compressor mechanically connected to a reciprocating member of a linear electric motor or alternator. A source of a high frequency, alternating, electrical signal applies a high frequency signal to the winding circuit of the linear alternator or motor. A filter circuit is connected to the winding circuit and passes electrical signals at the frequency of the high frequency source and blocks signals at the operating frequency of reciprocation. A peak detector circuit is connected to the filter circuit and detects the peak of the filter circuit output signal to provide an instantaneous peak magnitude that is proportional to the instantaneous piston position.

15 Claims, 2 Drawing Sheets

DETECTION OF THE INSTANTANEOUS POSITION OF A LINEARLY RECIPROCATING MEMBER USING HIGH FREQUENCY INJECTION

BACKGROUND OF THE INVENTION

1. Field of the Invention

This invention relates generally to free piston Stirling engines, free piston Stirling heat pumps or coolers, compressors or other mechanical loads drivingly connected to a linear alternator or linear motor and more particularly relates to a circuit for sensing, and for providing a signal that is proportional to, the instantaneous position of the reciprocating piston of the Stirling engine, cooler or heat pump or compressor and the instantaneous position of the reciprocating member of the linear alternator or motor.

2. Description of the Related Art

Stirling machines have been known for nearly two centuries but in recent decades have been the subject of considerable development because of advantages they offer. In a Stirling machine, a working gas is confined in a working space comprised of an expansion space and a compression space. The working gas is alternately expanded and compressed in order to either do work or to pump heat. Stirling machines cyclically shuttle a working gas between the compression space and the expansion space which are connected in fluid communication through a heat accepter, regenerator and heat rejecter. The shuttling is commonly done by pistons reciprocating in cylinders and cyclically changes the relative proportion of working gas in each space. Gas that is in the expansion space, and/or gas that is flowing into the expansion space through a heat exchanger (the accepter) between the regenerator and the expansion space, accepts heat from surrounding surfaces. Gas that is in the compression space, and/or gas that is flowing into the compression space through a heat exchanger (the rejecter) between the regenerator and the compression space, rejects heat to surrounding surfaces. The gas pressure is essentially the same in both spaces at any instant of time because the spaces are interconnected through a path having a relatively low flow resistance. However, the pressure of the working gas in the work space as a whole varies cyclically and periodically. When most of the working gas is in the compression space, heat is rejected from the gas. When most of the working gas is in the expansion space, the gas accepts heat. This is true whether the machine is working as a heat pump or as an engine. The only requirement to differentiate between work produced or heat pumped, is the temperature at which the expansion process is carried out. If this expansion process temperature is higher than the temperature of the compression space, then the machine is inclined to produce work and if this expansion process temperature is lower than the compression space temperature, then the machine will pump heat from a cold source to a warm sink.

Stirling machines can therefore be designed to use the above principles to provide either (1) an engine having pistons driven by applying an external source of heat energy to the expansion space and transferring heat away from the compression space, or (2) a heat pump having pistons cyclically driven by a prime mover for pumping heat from the expansion space to the compression space. The heat pump mode permits Stirling machines to be used for cooling an object in thermal connection to its expansion space, including to cryogenic temperatures, or heating an object, such as a home heating heat exchanger, in thermal connection to its compression space. Therefore, the term Stirling "machine" is used to generically include both Stirling engines and Stirling heat pumps.

Until about 1965, Stirling machines were constructed as kinematically driven machines meaning that the pistons are connected to each other by a mechanical linkage, typically connecting rods and crankshafts. The free piston Stirling machine was then invented by William Beale. In the free piston Stirling machine, the pistons are not connected to a mechanical drive linkage. Free-piston Stirling machines are constructed as mechanical oscillators and one of its pistons, conventionally identified as a displacer, is driven by the working gas pressure variations in the machine. The other piston, conventionally identified as the power piston, is either driven by a reciprocating prime mover when the Stirling machine is operated in its heat pumping mode or drives a reciprocating mechanical load when the Stirling machine is operated as an engine. Free piston Stirling machines offer numerous advantages including the control of their frequency and phase and their lack of a requirement for a seal between moving parts to prevent the mixing of working gas and lubricating oil.

Stirling machines are often connected to a linear motor or alternator. A Stirling engine is connected to a linear alternator to generate electric power and a Stirling machine operated in a heat pumping mode is connected to and driven by a linear electric motor. Both an electric linear motor and an electric linear alternator are the same basic device. They have a stator, ordinarily having an armature winding, and a reciprocating member that includes magnets, usually permanent magnets. Because they are essentially the same fundamental structure, they will sometimes be collectively referred to as a motor/alternator.

Consequently, both a Stirling machine and a linear motor/alternator structure are energy transducers that can each be operated in either of two modes. A Stirling machine can be driven mechanically in reciprocation by a prime mover to pump heat from a lower temperature mass to a higher temperature mass. A Stirling machine can be driven by the energy of the temperature difference between two masses and provide an output of mechanical reciprocation. Similarly, a linear motor/alternator structure can be mechanically driven in reciprocation by a prime mover to generate electrical power output or a linear motor/alternator be driven by a source of alternating electrical power to operate as a motor providing a mechanical reciprocating output. Therefore, a Stirling machine operating as an engine can be used to drive a linear alternator and a linear motor can be used to drive a Stirling machine operating in a heat pumping mode. In both of these cases, the power piston of the Stirling machine is ordinarily directly connected to the reciprocating member of the linear motor or alternator so that they reciprocate as a unit. Additionally, linear electric motors can be connected to and used to drive the piston of a compressor for compressing a gas, such as in a refrigerator, or for pumping a fluid.

All of these combinations utilize control circuits not only to assure that the pistons do not reciprocate at an excessive stroke and collide with other machine structures, but also to maximize their operating efficiency, control power or control other operating parameters. Therefore, one important parameter of operation that is useful to detect or sense and apply a corresponding signal to the control circuit for controlling these machines is the instantaneous position of the piston and its connected reciprocating member of the linear motor or alternator.

One device that has been proposed for sensing the piston position is illustrated in U.S. Pat. No. 4,667,158, which is herein incorporated by reference. However, that invention requires that a special transducer, that is dedicated to sensing the piston position, be mounted in the machine. This transducer has a ferromagnetic tube, a coil and a core all of which must be located and mounted within the machine. That transducer has the disadvantage that it adds weight and additional expense, requires mounting and occupies space within the machine and is an additional component that can fail.

Another proposed manner of detecting piston position is described in U.S. Pat. No. 5,342,176 which is herein incorporated by reference. The invention of that patent computes piston position from the back emf induced on the windings by the magnets and the current of the electric linear motor at the operating frequency of the linear motor. This prior art detection system has the disadvantage that it requires measurement of the inductance of the alternator winding, the AC resistance and the back emf constant (also known as the motor constant) α. The open circuit winding voltage is proportional to the piston velocity and the back emf constant α is the proportionality constant that relates open circuit winding voltage to piston velocity. The winding current is directly proportional to the force on the piston and the proportionality constant is also α. The back emf constant α is temperature dependent as is the winding resistance. Consequently, measurements of stroke amplitude using the method of U.S. Pat. No. 5,342,176 exhibit errors resulting from drift of the detected stroke amplitude as a function of temperature.

It is therefore an object and feature of the invention to provide a circuit for detecting the instantaneous position of the reciprocating member and a piston connected to it that does not require the installation of additional hardware within the machine and provides a signal that is proportional to the instantaneous position of the piston and its connected reciprocating member of an electric linear motor/alternator structure but also is independent of the voltage and current at the operating frequency of reciprocation of the machine.

BRIEF SUMMARY OF THE INVENTION

The invention is a method and circuit for sensing the instantaneous position of a piston of a free piston Stirling engine, a free piston Stirling cooler, a linear compressor or other prime mover or mechanical load mechanically connected to the reciprocating member of an electric linear electric motor or alternator. A linear electric motor or alternator has a winding electrically connected in a winding circuit to either a source of electrical driving power or to an electrical load. The reciprocating member is reciprocatable at an operating frequency of reciprocation. The invention applies a high frequency, alternating, electrical signal to the winding. The winding voltage or current is filtered by passing signals at the high frequency and blocking signals at the operating frequency of the electric linear motor or alternator. The instantaneous peak value of the filtered signal as a function of time is detected to provide an output signal that is substantially a linear function of the instantaneous piston position as a function of time and is independent of the high power currents or voltages at the low operating frequency of reciprocation

Figure 1:
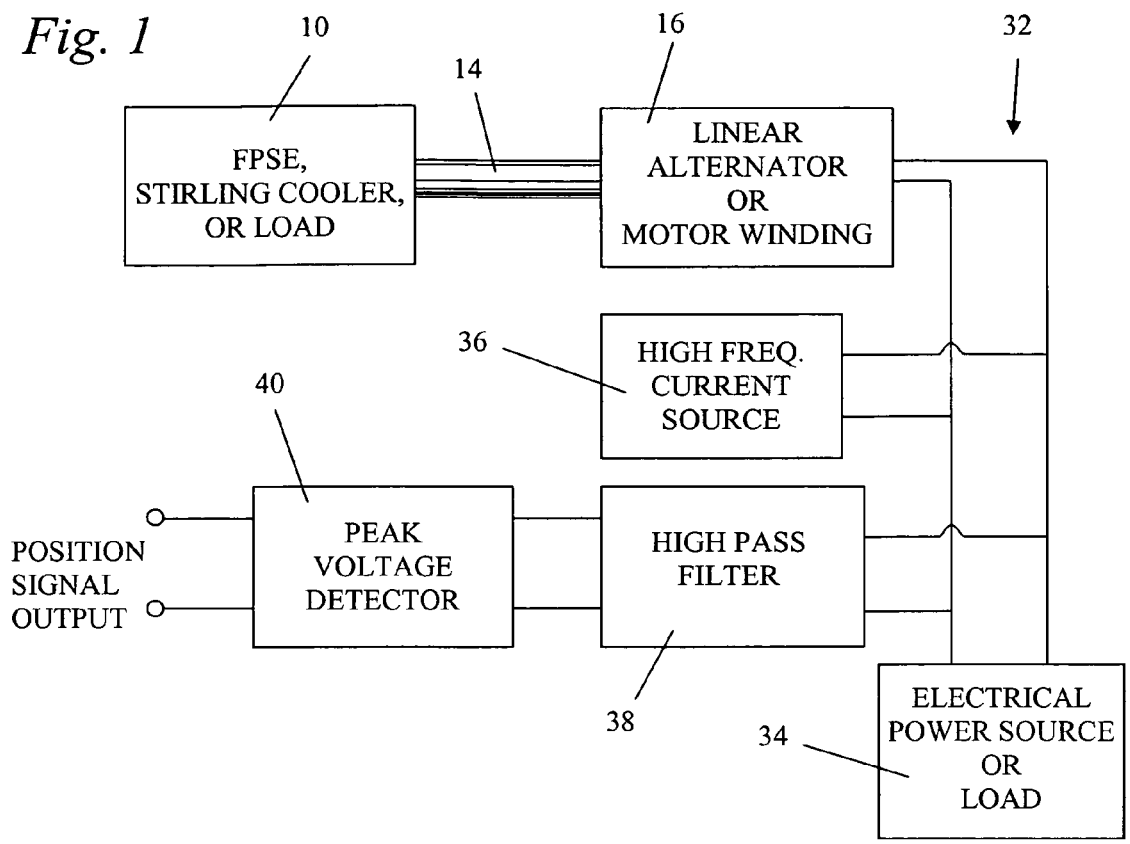
FIG. 1 is a block diagram of the preferred embodiment of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

Figure 3:
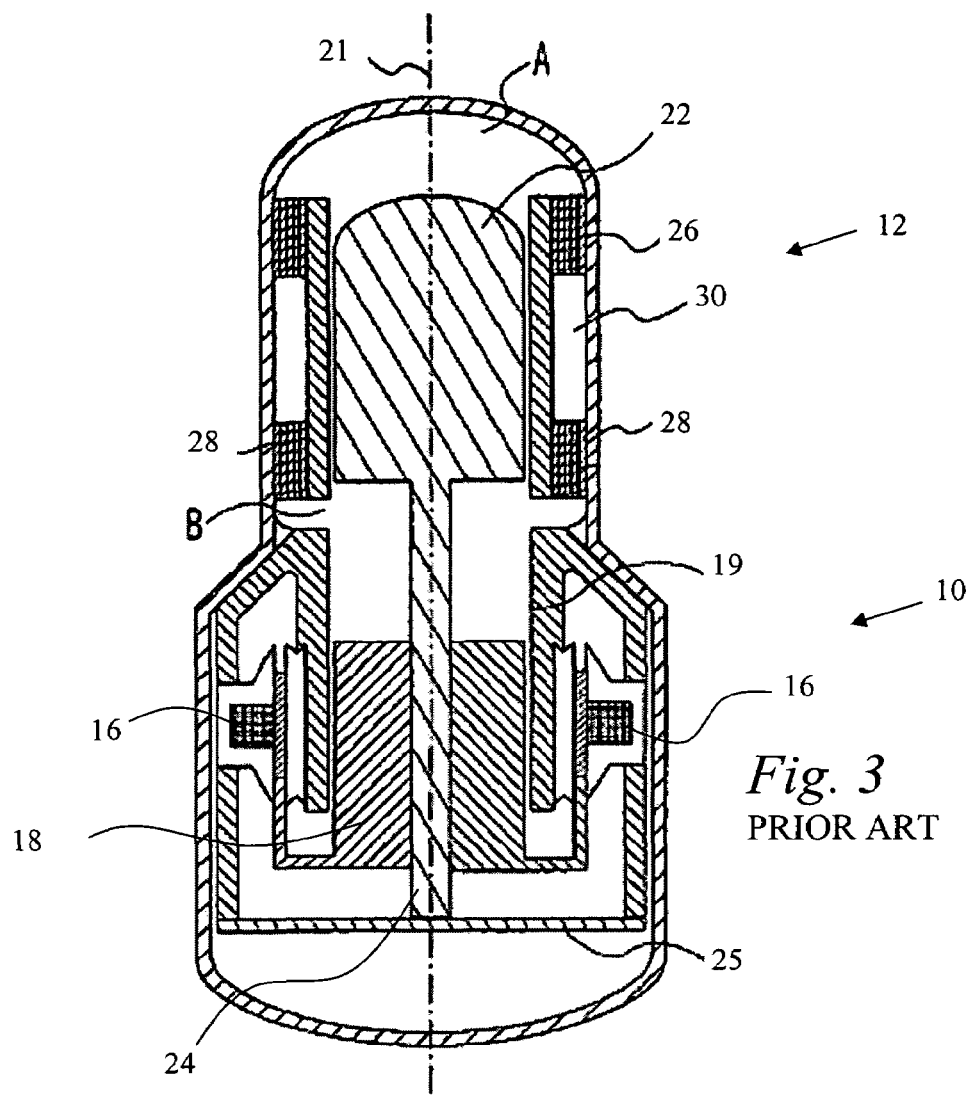
FIG. 3 is a view in axial section of a Stirling machine connected to and driving or driven by a linear motor/alternator.

The block diagram of FIG. 1 diagrammatically illustrates a free piston Stirling machine or a compressor 10 mechanically connected to the reciprocating member of a linear electric motor/alternator through a symbolic connecting rod 14. A representative, prior art implementation of these structures is illustrated in FIG. 3. The Stirling machine and the linear motor/alternator are mechanically integrated to some extent so they do not appear in FIG. 3 in a simple side by side arrangement. The linear electric motor/alternator 10 has an armature winding 16. The power piston 18 of the Stirling machine 12 reciprocates axially within a cylinder 19 at an operating frequency of reciprocation and is rigidly connected to and supports a series of permanent magnets 20 which, therefore, also reciprocate axially (along axis 21) within the armature winding 16 at the operating frequency of reciprocation. Consequently, because the piston 18 and the magnets and their supports are integrated together, the piston and the reciprocating member of the motor/alternator are a single unit. The displacer 22 of the Stirling machine is fixed to one end of a connecting rod 24 and the opposite end of the connecting rod 24 is connected to a planar spring 25 so that the displacer 22 and its connecting rod 24 can also reciprocate axially at the operating frequency of reciprocation. This operating frequency is typically approximately the resonant frequency of the mass of the piston 18 and its attached masses and the spring forces, principally the spring forces of the planar spring 25 and the gas spring forces of the working gas within the hermetically sealed machine. Free piston Stirling machines typically operate in the frequency range from about 30 Hz to 120 Hz. The Stirling machine also has heat exchangers 26 and 28 and an interposed regenerator 30 through which working gas is shuttled between the expansion space A and compression space B.

Several other similar combinations of a free piston Stirling machine and a motor/alternator are known in the prior art and therefore are not illustrated. For example, the Stirling machine and the motor/alternator may not be integrated or they may be integrated in a different manner.

Additionally, instead of connecting a linear alternator to a Stirling machine, a linear alternator can be connected in a similar or different manner to the piston of a pump or compressor or to other mechanical loads.

As illustrated in FIG. 1, the winding 16 of the motor/alternator is electrically connected in a winding circuit 32 to a source of electrical driving power or to an electrical load 34. The latter is an electrical source when the motor/alternator is used as a motor and is an electrical load when the motor/alternator 12 is used as an alternator.

The sensing circuit of the present invention has a source 36 of a high frequency, alternating, electrical signal connected to apply its high frequency signal to the winding circuit. A filter circuit 38 has an input connected to the winding circuit 32. The filter circuit 38 passes electrical signals at the frequency of the high frequency source and blocks signals at the operating frequency of reciprocation. The operating frequency of reciprocation is also the frequency of the electrical power signals in the winding circuit 32. The purpose of the filter circuit 38 is to separate the high frequency signal from the operating frequency of the AC power in order to retrieve the high frequency signal. Although a band pass filter is preferred in order to eliminate all other signals, such as harmonics of the operating frequency or spurious signals and noise, a high pass filter may be used.

A peak detector circuit 40 is connected to the output of the filter circuit 38 and detects the peak of the filter circuit output signal to provide a detected instantaneous peak magnitude that is proportional to the instantaneous piston position or position of the reciprocating member of the motor alternator. As known in the electronics art, a peak detector is a circuit that provides an output that essentially follows the peaks of the alternating high frequency signal. Its output signal is the envelope of the high frequency signal and such peak detectors have been used for decades for detection of amplitude modulation signals in AM broadcasting communications. A simple implementation is a diode and capacitor, the basis for the historic "crystal set" AM receiver.

Preferably, the high frequency source 36 is a current source connected parallel to the winding 16 and the peak detector is a voltage peak detector that detects high frequency voltage peaks across the winding and is also connected parallel across the winding 16.

Operation is based upon the observation that, as the reciprocating member of the motor/alternator reciprocates, which in the embodiment of FIG. 3 is principally the piston 18, the amount of metal within the winding 16 and therefore the reluctance of the magnetic flux path within the winding 16 varies. Consequently the effective impedance of the winding 16 varies and it varies as a linear function of the position of the reciprocating member or piston 18. In the embodiment illustrated in FIG. 3 and with a reciprocating piston 18 constructed of a non-ferromagnetic material, the winding impedance is maximum when the minimum amount of the mass of piston 18 is within the winding 16. In the configuration of FIG. 3, that maximum impedance occurs when the piston 18 is has moved its minimum distance in toward the expansion space A; that is when the piston 18 is farthest from the expansion space A. Conversely, the winding impedance is at its minimum when the piston 18 is its maximum distance in toward the expansion space A; that is closest to the expansion space A. With the high frequency current source 36 connected parallel to the winding 16, the peaks of the high frequency voltage across the winding will vary in proportion to the winding impedance and therefore in proportion to the position of the piston 18.

Figure 4:
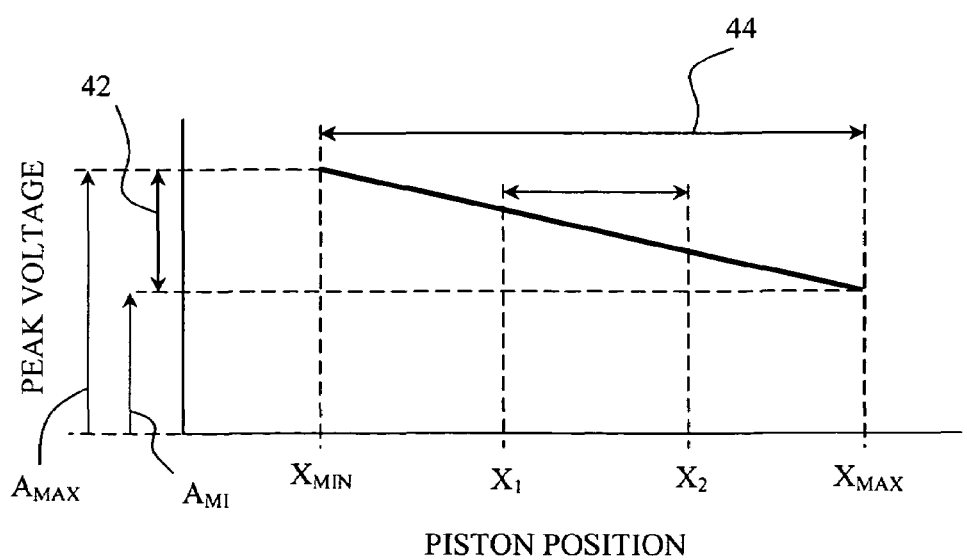
FIG. 4 is a graph illustrating the relationship of piston position to detected peak output voltage for the preferred embodiment of the invention.

FIG. 4 illustrates this variation and the substantially linear relationship between the voltage amplitude peaks and the piston displacement. For example, if the piston is reciprocating between $X_{MIN}$ and $X_{MAX}$, then the high frequency voltage peaks that pass the filter 38 will vary between $A_{MIN}$ and $A_{MAX}$. Since the output of the peak detector 40 corresponds to the envelope of the high frequency voltage peaks, the AC output 42 of the peak detector (i.e. DC shifted) represents the approximately sinusoidal motion 44 of the piston. More specifically, the instantaneous value of the AC output 42 of the peak detector 40 as a function of time will be directly proportional to the instantaneous position of the piston as a function of time. If the piston stroke is less, such as piston reciprocation between $X_1$ and $X_2$, the output of the peak detector 40 will be proportionally reduced.

It is important that time varying voltages and currents, in the motor/alternator circuit 32 at the operating frequency of reciprocation, be eliminated by the filter so that the signal detected by the peak detector 40 will not be a function of those lower frequency voltages and currents. Effective and practical filtering requires that the high frequency be at least 10 times the operating frequency of reciprocation and more preferably at least 100 times the operating frequency of reciprocation. However, the rate of variation of the impedance of the winding 16 as a function of the amount of non-ferromagnetic mass within the winding is greater for higher frequencies. Therefore, it is preferable to use a high frequency source in the range of 20 kHz to 200 kHz. I have found it particularly advantageous to use a high frequency source that is substantially 40 kHz or is substantially 200 kHz.

The basic concept of the invention is to inject or apply a high frequency, alternating, electrical signal to the winding to take advantage of the impedance variations of the winding as a function of the position of the reciprocating member. The winding voltage or current at the injected high frequency is filtered to recover a signal that is proportional to the position of the reciprocating member but independent of the high power voltages and currents of the winding and its winding circuit. The instantaneous peak value of the filtered signal as a function of time is detected to provide an output signal that is substantially a linear function of the instantaneous piston position as a function of time. There are alternative circuits for utilizing this concept.

Figure 2:
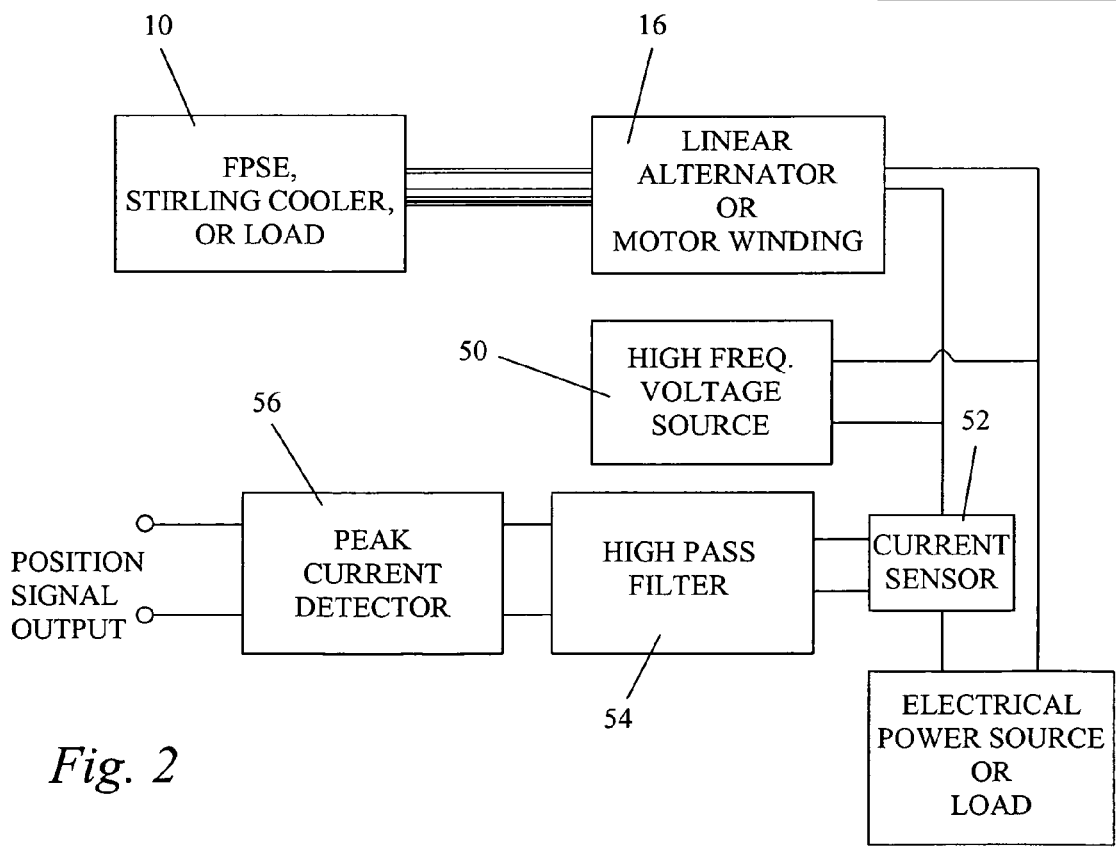
FIG. 2 is a block diagram of an alternative embodiment of the invention.

FIG. 2 represents one such alternative circuit. It also has a free piston Stirling machine 10 connected to a motor/alternator with a winding 16. However, the high frequency signal is applied by a high frequency voltage source 50 connected parallel across the winding 16. Instead of filtering and detecting the peaks or envelope of the motor/alternator voltage, the motor/alternator current is detected. To accomplish this, a current sensor 52 is connected in series in the winding circuit between the linear motor/alternator winding and the electrical power source or electrical load. The current sensor can be a resistive element but must be relatively small because it carries the high power motor/alternator current. Alternatively, a zero resistance ammeter circuit, a current transformer or other ways known in the art for sensing electrical current can be used. The filter circuit 54 is connected to the current sensor 52 and the peak detector 56 is a current peak detector that detects high frequency current peaks. This arrangement is not preferred because of the need to interpose a resistive element in the power circuit.

It is also theoretically possible to interpose the high frequency source in series with the winding and the electrical power source or load, but that not preferred because the source would be required to conduct the relatively high currents of the high power circuit.

The invention also can be used with a reciprocating member within the winding that is ferromagnetic. However, as will be apparent to those skilled in the art, the effect of moving iron into the winding is to increase its inductance and therefore its impedance.

Although there are some temperature dependencies with the present invention, there is not as much as with the previously mentioned prior art. Most of temperature drifts cause a shift the center point of the AC sinusoid, but the gain shift is much less than is present with the previously mentioned prior art. The DC center point shift can be compensated for using temperature measurements.

Persons skilled in the electronic arts will recognize that sensing circuits embodying the invention can be implemented with conventional analog circuit elements or with digital circuit elements such as microcontrollers or other microprocessor based computer circuits or combinations of them. As known in the current state of the art, analog circuit operations can be economically performed by software programmed digital circuits having software algorithms that simulate analog circuit operations.

While certain preferred embodiments of the present invention have been disclosed in detail, it is to be understood that various modifications may be adopted without departing from the spirit of the invention or scope of the following claims.

The invention claimed is:

1. A piston position sensing circuit for sensing instantaneous piston position of a piston of a free piston Stirling machine or a compressor mechanically connected to a reciprocating member of a linear electric motor or alternator, the linear electric motor or alternator having a winding electrically connected in a winding circuit to a source of electrical driving power or to an electrical load, the reciprocating member being reciprocatable at an operating frequency of reciprocation, the sensing circuit providing an output signal that is substantially a linear function of the piston position and comprising:
   (a) a source of a high frequency, alternating, electrical signal connected to apply its high frequency signal to the winding;
   (b) a filter circuit having an input connected to the winding circuit, the filter passing electrical signals at the frequency of the high frequency source and blocking signals at the operating frequency of reciprocation; and
   (c) a peak detector circuit connected to an output of the filter circuit and detecting the peak of the filter circuit output signal whereby the detected instantaneous peak magnitude is proportional to the instantaneous piston position.

2. A piston position sensing circuit in accordance with claim 1 wherein the frequency of the high frequency source is at least 100 times the operating frequency of reciprocation.

3. A piston position sensing circuit in accordance with claim 2 wherein the frequency of the high frequency source is in the range from substantially 20 kHz to 200 kHz.

4. A piston position sensing circuit in accordance with claim 3 wherein the frequency of the high frequency source is substantially 40 kHz.

5. A piston position sensing circuit in accordance with claim 3 wherein the frequency of the high frequency source is substantially 200 kHz.

6. A piston position sensing circuit in accordance with claim 1 wherein the high frequency source is a current source connected parallel to the winding and the peak detector is a voltage peak detector that detects high frequency voltage peaks across the winding.

7. A piston position sensing circuit in accordance with claim 1 wherein the high frequency source is a voltage source connected parallel to the winding, a current sensor is connected in series in the winding circuit between the linear alternator or motor winding and the electrical power source or electrical load, the filter circuit is connected to the current sensor and the peak detector is a current peak detector that detects high frequency current peaks.

8. A method for sensing instantaneous piston position of a piston of a free piston Stirling engine, a free piston Stirling cooler or a compressor mechanically connected to a reciprocating member of an electric linear electric motor or alternator, the linear electric motor or alternator having a winding electrically connected in a winding circuit to a source of electrical driving power or to an electrical load, the reciprocating member being reciprocatable at an operating frequency of reciprocation, the method comprising:
   (a) applying a high frequency, alternating, electrical signal to the winding;
   (b) filtering the winding voltage or current by passing signals at the high frequency and blocking signals at the operating frequency of the electric linear motor or alternator; and
   (c) detecting the instantaneous peak value of the filtered signal as a function of time to provide an output signal that is substantially a linear function of the instantaneous piston position as a function of time.

9. A method in accordance with claim 8 wherein the high frequency is at least 10 times the operating frequency of reciprocation.

10. A method in accordance with claim 9 wherein a high frequency that is at least 100 times the operating frequency of reciprocation is applied.

11. A method in accordance with claim 10 wherein a high frequency that is in the range of 20 kHz to 200 kHz is applied.

12. A piston position sensing circuit in accordance with claim 11 wherein a high frequency of substantially 40 kHz is applied.

13. A piston position sensing circuit in accordance with claim 11 wherein a high frequency of substantially 200 kHz is applied.

14. A method in accordance with claim 8 wherein the step of applying a high frequency, alternating, electrical signal comprises applying a high frequency, alternating, electrical current across the winding and the filtering and detecting steps comprise filtering and detecting high frequency voltage across the winding.

15. A method in accordance with claim 8 wherein the step of applying a high frequency, alternating, electrical signal comprises applying a high frequency, alternating, electrical voltage across the winding and the filtering and detecting steps comprise filtering and detecting high frequency current through the winding.

* * * * *